United States Patent [19]

Moran et al.

[11] 4,012,578
[45] Mar. 15, 1977

[54] ONE PIECE CONNECTOR FOR FLEXIBLE CONDUIT

[75] Inventors: Thomas M. Moran, Cleveland; Joseph H. Paskert, Lakewood, both of Ohio

[73] Assignee: Eaton Corporation, Cleveland, Ohio

[22] Filed: July 2, 1975

[21] Appl. No.: 592,587

[52] U.S. Cl. .............................. 174/51; 174/65 R; 285/162; 285/175

[51] Int. Cl.² ..................................... H02G 3/06

[58] Field of Search ........... 174/65 R, 51; 285/162, 285/175, 176; 339/14 R; 248/56

[56] References Cited
UNITED STATES PATENTS

| | | | |
|---|---|---|---|
| 2,466,504 | 4/1949 | Stoyer | 285/162 |
| 3,814,467 | 6/1974 | Van Buren | 174/65 R X |
| 3,858,151 | 12/1974 | Paskert | 174/15 X |

Primary Examiner—Arthur T. Grimley
Assistant Examiner—David A. Tone
Attorney, Agent, or Firm—Teagno & Toddy

[57] ABSTRACT

An improved one-piece connector clip for securing a helically grooved flexible electrical conduit within generally round apertures in a junction box is disclosed. The body of the clip comprises a plurality of generally flat sides and is provided with tabs which engage the helical groove in the conduit to prevent the conduit from being pulled out of the clip and to electrically interconnect the clip and the conduit. A collar on the inner end of the clip encloses the end of the conduit to protect the wires contained therein against any burrs which may be present on the end of the conduit. Resiliently deflectable retaining arms and flanges clampingly engage a wall of the junction box to hold the clip and conduit in place and to electrically interconnect the clip and the junction box. In one embodiment of the invention, the body of the clip has a generally square cross-sectional configuration, in another embodiment the body has a generally truncated equilateral triangular shape, while in still another embodiment the body has a generally hexagonal shape.

29 Claims, 10 Drawing Figures

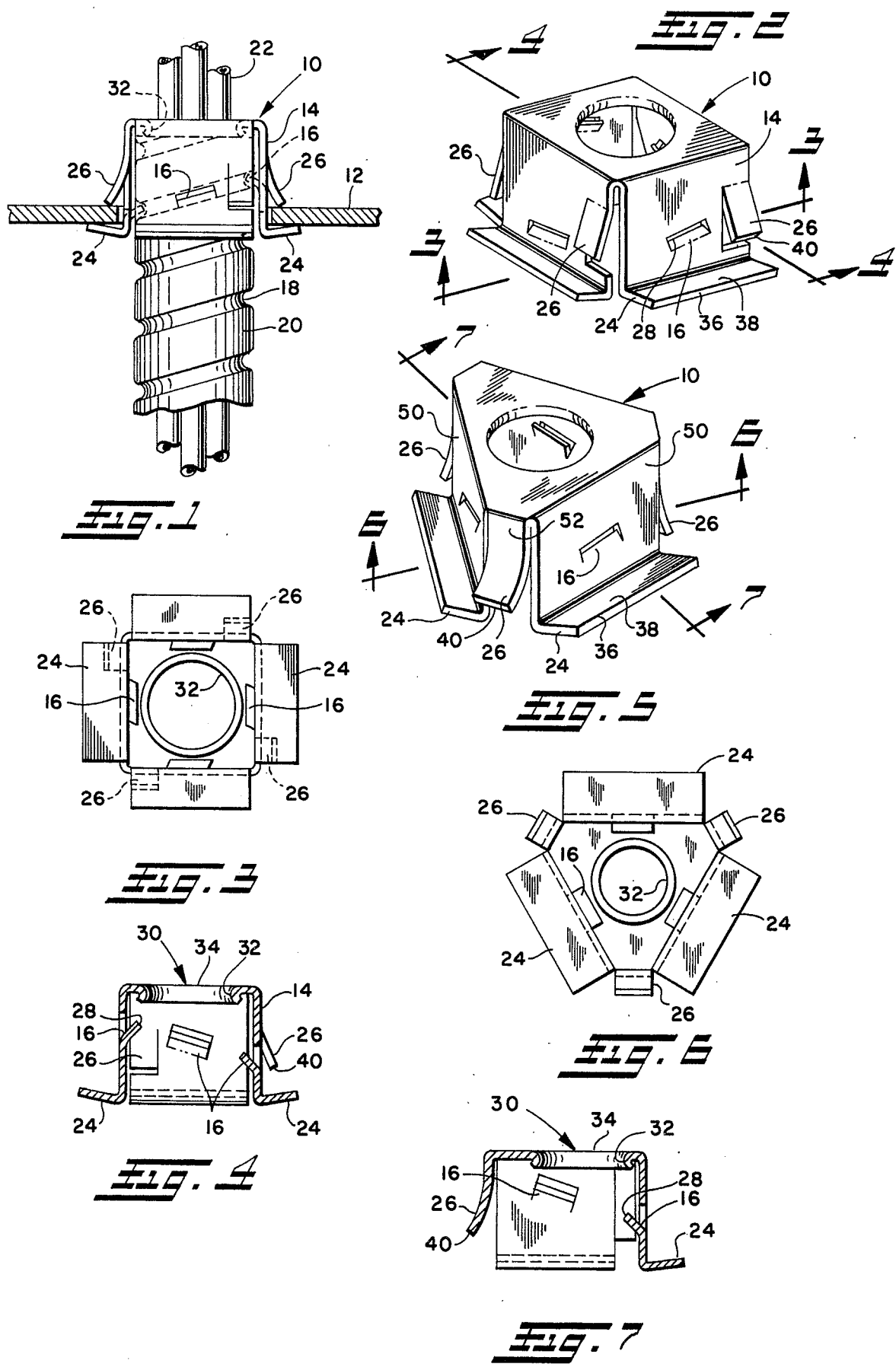

ONE PIECE CONNECTOR FOR FLEXIBLE CONDUIT

BACKGROUND OF THE INVENTION

1. Field of the Invention

The present invention relates to an electrical conduit connector, and more particularly to a new and improved connector for mechanically and electrically attaching a helically grooved flexible conduit to a junction box or the like.

2. Description of the Prior Art

Various methods have been utilized for connecting a helically grooved flexible electrical conduit to a junction box. One such method is to use a theaded die cast sleeve and nut assembly. Other methods utilize clip assemblies having multiple components or components with intricate configurations. An inherent disadvantage in all of these methods is that they require high manufacturing and/or installation costs. Additionally, these methods do not provide positive electrical grounding between the electrical conduit and the junction box. U.S. Pat. No. 3,858,151 discloses a round one-piece clip for attaching flexible conduit to a junction box. This clip is not totally satisfactory as the use of a round clip to mount standard conduit to standard boxes utilizing standard knockout apertures will often result in undesirable looseness of the conduit in the clip. Because of these disadvantages, it has become desirable to find a low cost, easily installable, electrical connector that provides a positive electrical ground between the electrical conduit and the junction box and which will provide sufficient support for the electrical conduit in the junction box.

SUMMARY OF THE INVENTION

The present invention provides a solution to the problems of high manufacturing and installation costs, provides a positive electrical ground between the flexible electrical conduit and the junction box, and provides sufficient support for the electrical conduit in the junction box.

An improved one-piece metal clip to connect a helically grooved electrical conduit to a junction box is disclosed. The clip is constructed so that it can be readily connected to one end of the electrical conduit. The clip with the electrical conduit contained therein is then connected to the junction box by insertion of the clip into an opening provided in the junction box. Once the clip is connected to the junction box, the body of the clip is disposed within the junction box where it is protected against engagement with foreign objects. The clip engages the electrical conduit in such a manner as to prevent disengagement of the conduit from the clip by pulling the conduit. In addition, the clip is constructed to firmly engage the electrical conduit and the junction box providing a positive electrical ground between the conduit and the junction box.

The clip has tabs on its body portion which threadably engage the helical groove provided on the conduit. As the body of the clip is pushed through an opening in the junction box, retaining arms are resiliently deflected inwardly until flanges on an outer end of the clip are in firm contact with the outer surface of the junction box. The retaining arms then spring outwardly to securely clamp the wall of the junction box and hold the clip and flexible conduit in firm engagement with the junction box. In one embodiment of the invention, the clip has a generally square body portion with tabs provided in the walls thereof and a retaining arm projecting from each of the four walls. In another embodiment of the invention, the body portion of the clip has a generally truncated equilateral shape in cross section with three axially extending walls of relatively longer width alternately interspersed among three axially extending walls of relatively shorter width. In this embodiment, the tabs are provided in the walls of relatively longer width and the retaining arms project outwardly from the walls of relatively shorter width. In still another embodiment of the invention, the body portion of the clip is hexagonal in cross section with three axially extending walls of relatively longer length alternately interspersed among three axially extending walls of relatively shorter length. The walls of relatively longer length in this embodiment are provided with tabs while the retaining arms are formed in the walls of relatively shorter length.

The use of a clip having a body portion comprised of generally flat sides to mount a generally round conduit within a generally round aperture of larger diameter than the outer diameter of the conduit in a junction box allows the flat sides of the clip to lie against, or close to, the outer diameter of the clip to support same relative to the junction box.

Inasmuch as this connector is produced as a onepiece construction, manufacturing and installation costs are less. Additionally, since the flanges provided on the metal clip firmly and resiliently engage one surface of the junction box and the retaining arms engage the other surface, positive electrical grounding between the electrical conduit and the junction box occurs. Thus, this invention overcomes all of the problems associated with electrical conduit connectors presently available.

Accordingly, it is an object of the present invention to provide a new and improved electrical conduit connector.

Another object of the present invention is to provide an electrical conduit connector having a one-piece construction.

A further object of the present invention is to provide an electrical conduit connector that is relatively inexpensive to produce and install.

A still another object of the present invention is to provide an electrical conduit connector that establishes a positive electrical ground between the electrical conduit and the junction box.

These and other objects and advantages of the present invention will become apparent from the following detailed description taken in connection with the accompanying drawings.

BRIEF DESCRIPTION OF THE DRAWINGS

FIG. 1 is a side elevation view of a flexible conduit connected to a junction box by a one-piece connector clip constructed in accordance with the present invention.

FIG. 2 is a pictorial illustration of one embodiment of the connector clip.

FIG. 3 is a plan view of the connector clip taken along lines 3—3 of FIG. 2.

FIG. 4 is a cross-sectional view taken along section-indicating lines 4—4 of FIG. 2 further illustrating the construction of the connector clip shown in FIG. 2.

FIG. 5 is a pictorial illustration of another embodiment of the connector clip.

FIG. 6 is a plan view of the connector clip taken along lines 6—6 of FIG. 5.

FIG. 7 is a cross-sectional view taken along section-indicating lines 7—7 of FIG. 5 further illustrating the construction of the connector clip shown in FIG. 5.

DESCRIPTION OF THE PREFERRED EMBODIMENT

Figure 8:
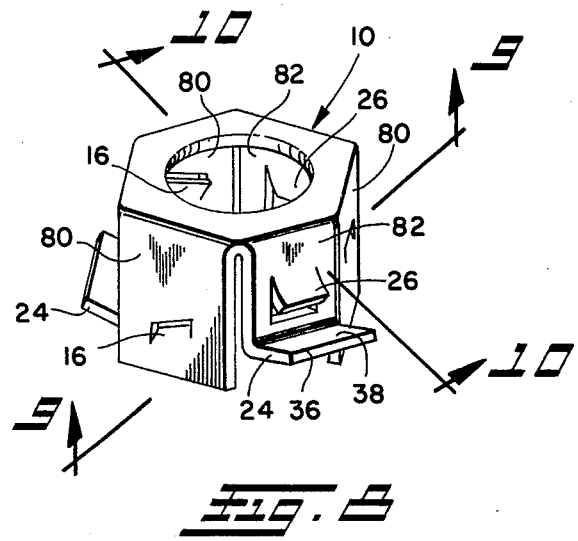
FIG. 8 is a pictorial illustration of still another embodiment of the connector clip.

An improved one-piece connector clip 10 constructed in accordance with the present invention is shown in FIG. 1 in association with a wall 12 of a junction box. The clip 10 has a square cross-sectional configuration with walls 14, each wall being provided with an inwardly projecting tab 16 which is disposed for threaded engagement with a helical groove 18 formed in a flexible electrical conduit 20 to prevent conduit 20 from being pulled out of the clip 10. The conduit 20 has wires 22 provided therein. The clip itself is held against movement relative to the wall 12 of the junction box by the cooperation between outwardly projecting flanges 24 and retaining arms 26 which engage opposite sides of wall 12.

When the electrical conduit 20 is to be connected to a junction box, the clip 10 is turned or threaded onto one end of conduit 20 and then inserted into the junction box. It should be noted, however, that this connection sequence could be reversed in that clip 10 could be installed in the junction box and conduit 20 could be turned into clip 10 to connect conduit 20 to the junction box. To facilitate threading the clip 10 onto the conduit 20, the tabs 16 are formed with inner end portions 28 (see FIG. 4) which are disposed on a helix of the same pitch as the helix of the groove 18 in flexible conduit 20. Therefore, the inner end portions 28 of tabs 16 form a portion of a helix of substantially the same pitch and diameter as the helical groove 18 in the exterior wall of conduit 20. It should be noted that the inner end portions 28 either just clear the bottom of groove 18 or scrape slightly against it as the clip 10 is theaded onto the conduit 20.

As the clip 10 is turned onto the flexible conduit 20, an annular collar 30 in the inner end of the clip telescopes inside the conduit 20 to shield the electrical wires 22 against engagement with any burrs which may have been formed on the end of conduit 20 when it was cut to the desired length. The collar 30 includes an annular inner rim 32 which extends inside the end of the conduit 20 and an annular outer rim 34 having a curving surface which prevents damage to the wires 22 if they are pressed against collar 30.

The clip 10 is constructed so that the distance between the outer axial edges of diagonally opposite retaining arms 26 is just slightly larger than the diameter of the opening in wall 12 of the junction box causing the retaining arms 26 to engage the sides of the opening as the clip 10 is inserted into the opening. Further inward movement of the clip 10 into the opening results in resiliently deflectable retaining arms 26 being flexed radially inward. Still further movement of the clip 10 into the junction box causes engagement of flanges 24 with the outer surface of wall 12. The flanges 24 are bent upwardly as shown in FIG. 2 and are provided with relatively sharp edges 36 which engage the outer surface of wall 12 of the junction box before the major surfaces 38 of the flanges are pressed against the wall. When the flanges 24 have been pressed flat against the wall 12 of the junction box, the lower edge portions 40 of retaining arms 26 clear the inner surface of wall 12. When this occurs, the resiliently deflectable retaining arms 26 move outwardly to their original position. When the inward force against conduit 20 is relaxed, the flanges 24 flex in such a manner as to tend to pull the clip 10 out of the junction box. However, the lower edge portions 40 of the retaining arms 26 engage the inner surface of wall 12 to prevent clip 10 from being pulled out of the junction box.

The resiliently deflectable flanges 24 press the relatively sharp edges 36 against the outer surface of wall 12 of the junction box. This causes the sharp edges 36 to dig into the wall 12 and provide a solid electrical connection between the clip and the junction box. Since the inner end portions 28 of tabs 16 firmly engage the helical groove 18 in conduit 20, the clip 10 provides a solid electrical connection between the conduit 20 and the junction box to ground the conduit.

Once the clip 10 has been connected to the junction box, only the flanges 24 of the clip are disposed outside the junction box. This provides a neat appearance, prevents the clip from being damaged by foreign objects, and retards unauthorized removal of the clip from the junction box.

Another embodiment of the invention is shown in FIGS. 5 through 7. This embodiment differs from the previously mentioned embodiment in that it has a generally truncated equilateral triangular shape in cross-section rather than a square configuration. Those parts which are similar to those previously enumerated are given like numerals and will not be reviewed further.

In this embodiment of the invention, the body of the clip 10 is of a generally equilateral triangular shape in cross-section and is composed of walls 50 alternately interspersed among walls 52. Each of the walls 50 has a tab 16 disposed on a helix for threaded engagement with helical groove 18 provided in conduit 20. Each of the walls 52 is formed so that the portion thereof that is adjacent flange 24 is bent radially outward to form retaining arm 26. The relative widths of walls 50, 52 are such that retaining arms 26 will engage the sides of the opening in the junction box as the clip 10 is inserted into the opening. Movement of the clip into the junction box causes the inward deflection of retaining arms 26 and the engagement of flanges 24 with the outer surface of wall 12 of the junction box. The flanges 24 are deflected until they are flat against wall 12 of the junction box, at which time the arms 26 move radially outward to their original position capturing wall 12 between the retaining arm lower end portions 40 and the major surfaces 38 of flanges 24 preventing clip 10 from being pulled out of the junction box and providing a solid electrical connection between the conduit 20 and the junction box to ground the conduit.

Figure 9:
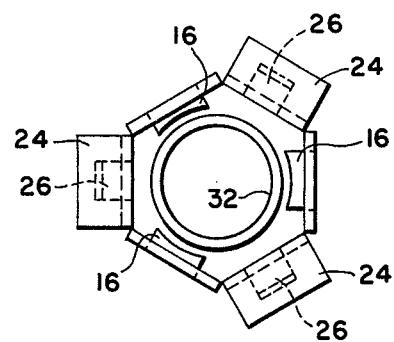
FIG. 9 is a plan view of the connector clip taken along lines 9—9 of FIG. 8.
Figure 10:
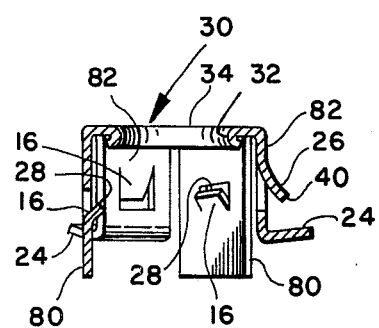
FIG. 10 is a cross-sectional view taken along section-indicating lines 10—10 of FIG. 8 further illustrating the construction of the connector clip shown in FIG. 8.

A still another embodiment of the invention is shown in FIGS. 8 through 10. This embodiment differs from the aforementioned embodiments in that it has a generally hexagonal shape in cross-section. Those parts which are similar to those previously enumerated are given like numerals and will not be reviewed further.

In this embodiment of the invention, the body of clip 10 is of a hexagonal shape in cross-section and is composed of walls 80 alternately interspersed among walls 82. Each of the walls 80 is provided with an inwardly projecting tab 16 which is disposed on a helix for threaded engagement with helical groove 18 provided on conduit 20 whereas each of the walls 82 is formed with an outwardly projecting retaining arm 26 and a flange 24 between which the wall 12 of the junction box is captured to secure the clip 10 to the junction box. The widths of walls 80 and 82 are such that the retaining arms 26 engage the sides of the opening in the junction box as the clip is inserted into the opening. As with the previous embodiments, movement of the clip 10 into the junction box causes the inward deflection of retaining arms 26 and the engagement of flanges 24 with the outer surface of wall 12 of the junction box. When the flanges 24 are flat against wall 12, the retaining arms 26 move radially outward to their original position capturing wall 12 between the retaining arm lower end portions 40 and the flange major surfaces 38 securing clip 10 to the junction box and providing a solid electrical ground connection between the conduit 20 and the junction box.

All of the aforementioned embodiments can be formed from a single piece of metal. Such a single piece construction of the clip facilitates connecting the clip 10 to the end of conduit 20 making such connection a simple task. As for the configuration formed, i.e, square, triangular, or hexagonal, the shape is dependent upon the size of the opening into which the clip is to be inserted. Each configuration covers a limited range of opening sizes in order to obtain maximum material utilization in the forming process. Inasmuch as these ranges are mutually exclusive, the clip configuration can also be used for segregating the clips according to size.

Although all of the embodiments of clip 10 have been described in association with a conduit 20 having only a single helical groove 18 in its outer surface, it is contemplated that a clip constructed in accordance with the present invention could be utilized in association with a conduit having a plurality of helical grooves formed in its outer surface. Of course, the inwardly projecting tabs 16 would be spaced so as to engage the helical grooves as the clip is turned onto the end of the conduit. Also, it should be noted that even though collar 30 shields wires 22 from end of the conduit 20, under certain circumstances a plastic sleeve may be utilized in association with the end of the conduit to further shield the wires from the conduit. In addition, it is contemplated that clip 10 could be used with conduits other than electrical conduits.

Variations of the present invention will be apparent to those having ordinary skill in the art and the invention is limited only by the spirit and scope of the following claims.

I claim:
1. A one-piece, self-retaining metal clip in combination with an electrical conduit having a helically grooved outer metal covering and electrical wires therein for use within a generally round aperture in a junction box or the like, said one-piece metal clip being adapted to extend through said aperture in a wall portion of said junction box, said one-piece metal clip comprising a body portion defined by generally flat walls for extending through said aperture in said junction box and into which said electrical conduit extends, said body portion having a first opening at one end thereof through which said electrical wires extend and a second opening at the other end thereof into which said electrical conduit extends, flange means at said other end of said body portion for engaging the outer surface of said junction box, said flange means comprising deflectable portions which are attached to and extend transversely outwardly from the generally flat walls defining said body portion and which have surface portions which will engage said outer surface of said junction box upon insertion of said one-piece metal clip into said aperture in said wall portion of said junction box, retaining arms formed in at least two of said walls defining said body portion, each of said retaining arms projecting outwardly for a portion of the axial length of said walls defining said body portion and being resiliently deflectable radially inwardly upon insertion of said body portion through said aperture in said junction box and springing outwardly upon passing through said aperture so as to engage the inner surface of said junction box, said retaining arms, in an undeformed position, being separated from said flange means by an axial distance less than the thickness of said wall portion of said junction box permitting said one-piece metal clip to be resiliently clamped to said junction box by said flange means and said retaining arms so as to positively electrically ground said one-piece metal clip to said junction box, at least two of said walls defining said body portion also having an inwardly extending tab formed therein, said tabs extending transversely toward the central axis of said body portion and having an inner elongated edge, said tabs being located at axially and circumferentially offset locations on said body portion permitting said inner elongated edges to be disposed along a helix of the same pitch as the helical groove in the metal covering to threadably connect said metal covering with said body portion, said tabs being spaced from said flange means toward said one end of said body portion causing said tabs to be disposed within said junction box when said electrical conduit is connected to said junction box, and collar means connected to said one end of said body portion to shield said electrical wires from engagement with any burrs which may be present on the outer end portion of said electrical conduit, said collar means including a rim portion disposable within said electrical conduit in a telescopic relationship with said outer end portion of said electrical conduit.

2. The invention as defined in claim 1, wherein said body portion is of a square shape in cross-section and each of said retaining arms is adjacent to and projects outwardly from an axially extending edge of said wall defining said square body portion.

3. The invention as defined in claim 2, wherein said retaining arms are connected to each of said walls defining said square body portion and said tabs are provided in each of said walls defining said square body portion.

4. The invention as defined in claim 3, wherein said tabs have a generally rectangular configuration.

5. The invention as defined in claim 1, wherein said body portion is of a generally truncated equilateral triangular shape in cross section and is defined by three axially extending walls of relatively longer width alternately interspersed among three axially extending walls of relatively shorter width, said tabs being provided in at least two of said walls of relatively longer width and said retaining arms being formed in at least two of said walls of relatively shorter width.

6. The invention as defined in claim 5, wherein said tabs are provided in each of said walls of relatively longer width and said retaining arms are formed in each of said walls of relatively shorter width.

7. The invention as defined in claim 6, wherein said tabs have a generally rectangular configuration.

8. The invention as defined in claim 1, wherein said body portion is of a hexagonal shape in cross section having three axially extending walls of relatively longer length alternately interspersed among three axially extending walls of relatively shorter length, said tabs being provided in at least two of said walls of relatively longer length and said retaining arms being formed in at least two of said walls of relatively shorter length.

9. The invention as defined in claim 8, wherein said tabs are formed in each of said walls of relatively longer length and said retaining arms are provided in each of said walls of relatively shorter length.

10. The invention as defined in claim 9, wherein said tabs have a generally rectangular configuration.

11. A one-piece, self-retaining metal clip in combination with an electrical conduit having a helically grooved outer metal covering and electrical wires therein for use with a junction box or the like, said one-piece metal clip being adapted to extend through a generally round opening in a wall portion of said junction box, said one-piece metal clip comprising a square body portion for extending through said opening in said junction box and into which said electrical conduit extends, said square body portion having a first opening at one end thereof through which said electrical wires extend and a second opening at the other end thereof into which said electrical conduit extends, flange means at said other end of said square body portion for engaging the outer surface of said junction box, said flange means comprising deflectable portions which are attached to and extend transversely outwardly from the walls defining said square body portion and which have surface portions which will engage said outer surface of said junction box upon insertion of said one-piece metal clip into said opening in said wall portion of said junction box, retaining arms connected to at least two of said walls defining said square body portion and adjacent said other end of said body portion, each of said retaining arms being adjacent to and projecting outwardly from an axially extending edge of said walls defining said square body portion and being resiliently deflectable radially inwardly upon insertion of said square body portion through said opening in said junction box and springing outwardly upon passing through said opening so as to engage the inner surface of said junction box, said retaining arms, in an undeformed position, being separated from said flange means by an axial distance less than the thickness of said wall portion of said junction box permitting said one-piece metal clip to be resiliently clamped to said junction box by said flange means and said retaining arms so as to positively electrically ground said one-piece metal clip to said junction box, at least two of said walls of said square body portion also having an inwardly extending tab formed therein, said tabs extending transversely toward the central axis of said square body portion and having an inner elongated edge, said tabs being located at axially and circumferentially offset locations on said square body portion permitting said inner elongated edges to be disposed along a helix of the same pitch as the helical groove in the metal covering for threaded engagement with said helical groove in said metal covering to threadably connect said metal covering with said square body portion, said tabs being spaced from said flange means toward said one end of said square body portion causing said tabs to be disposed within said junction box when said electrical conduit is connected to said junction box, and collar means connected to said one end of said square body portion to shield said electrical wires from engagement with any burrs which may be present on the outer end portion of said electrical conduit, said collar means including a rim portion disposable within said electrical conduit in a telescopic relationship with said outer end portion of said electrical conduit.

12. The invention as defined in claim 11, wherein said retaining arms are connected to each of said walls defining said square body portion and said tabs are provided in each of said walls defining said square body portion.

13. The invention as defined in claim 12, wherein said tabs have a generally rectangular configuration.

14. A one-piece, self-retaining metal clip in combination with an electrical conduit having a helically grooved outer metal covering and electrical wires therein for use with a junction box or the like, said one-piece metal clip being adapted to extend through a generally round opening in a wall portion of said junction box, said one-piece metal clip comprising a body portion for extending through said opening in said junction box and into which said electrical conduit extends, said body portion being of a generally truncated equilateral triangular shape in cross section and being defined by three axially extending walls of relatively longer width alternately interspersed among three axially extending walls of relatively shorter width, said body portion also having a first opening at one end thereof through which said electrical wires extend and a second opening at the other end thereof into which said electrical conduit extends, at least two of said walls of relatively shorter width being formed so as to project outwardly for a portion of the axial length of said walls to form a retaining arm adjacent said other end of said body portion, each of said retaining arms being resiliently deflectable radially inwardly upon insertion of said body portion through said opening in said junction box and springing outwardly upon passing through said opening so as to engage the inner surface of said junction box, flange means at said other end of said body portion for engaging the outer surface of said junction box, said flange means comprising deflectable portions which are attached to and extend transversely outwardly from said walls of relatively longer width and which have surface portions which will engage said outer surface of said junction box upon insertion of said onepiece metal clip into said opening in said wall portion of said junction box, said retaining arms, in an undeformed position, being separated from said flange means by an axial distance less than the thickness of said wall portion of said junction box permitting said one-piece metal clip to be resiliently clamped to said junction box by said flange means and said retaining arms so as to positively ground said one-piece metal clip to said junction box, at least two of said walls of relatively longer width also having an inwardly extending tab formed therein, said tab extending transversely toward the central axis of said body portion and having an inner elongated edge, said tabs being located at axially and circumferentially offset locations on said body portion permitting said inner elongated edges to be disposed along a helix of the same pitch as the helical groove in the metal covering for threaded engagement with said helical groove in said metal covering to threadably connect said metal covering with said body portion, said tabs being spaced from said flange means toward said one end of said body portion causing said tabs to be disposed within said junction box when said electrical conduit is connected to said junction box, and collar means connected to said one end of said body portion to shield said electrical wires from engagement with any burrs which may be present on the outer end portion of said electrical conduit, said collar means including a rim portion disposable within said electrical conduit in a telescopic relationship with said outer end portion of said electrical conduit.

15. The invention as defined in claim 14, wherein said retaining arms are formed in each of said walls of relatively shorter width and said tabs are provided in each of said walls of relatively longer width.

16. The invention as defined in claim 15, wherein said tabs have a generally rectangular configuration.

17. A one-piece, self-retaining metal clip in combination with an electrical conduit having a helically grooved outer metal covering and electrical wires therein for use with a junction box or the like, said one-piece metal clip being adapted to extend through a generally round opening in a wall portion of said junction box, said one-piece metal clip comprising a hexagonally shaped body portion having three axially extending walls of relatively longer length alternately interspersed among three axially extending walls of relatively shorter length, said body portion also having a first opening at one end thereof through which said electrical wires extend and a second opening at the other end thereof into which said electrical conduit extends, at least two of said walls of relatively shorter length having an outwardly extending retaining arms formed therein adjacent said other end of said body portion, each of said retaining arms being resiliently deflectable radially inwardly upon insertion of said body portion through said opening in said junction box and springing outwardly upon passing through said opening so as to engage the inner surface of said junction box, flange means at said other end of said body portion for engaging the outer surface of said junction box, said flange means comprising deflectable portions which are attached to and extend transversely outwardly from said walls of relatively shorter length and which have surface portions which will engage said outer surface of said junction box upon insertion of said one-piece metal clip into said opening in said wall portion of said junction box, said retaining arms, in an undeformed position, being separated from said flange means by an axial distance less than the thickness of said wall portion of said junction box permitting said one-piece metal clip to be resiliently clamped to said junction box by said flange means and said retaining arms so as to positively ground said one-piece metal clip to said junction box, at least two of said walls of relatively longer length having an inwardly extending tab formed therein, said tab extending transversely toward the central axis of said body portion and having an inner elongated edge, said tabs being located at axially and circumferentially offset locations on said body portion permitting said inner elongated edges to be disposed along a helix of the same pitch as said helical groove in said metal covering to threadably connect said metal covering with said body portion, said tabs being spaced from said flange means toward said one end of said body portion causing said tabs to be disposed within said junction box when said electrical conduit is connected to said junction box, and collar means connected to said one end of said body portion to shield said electrical wires from engagement with any burrs which may be present on the outer end portion of said electrical conduit, said collar means including a rim portion disposable within said electrical conduit in a telescopic relationship with said outer end portion of said electrical conduit.

18. The invention as defined in claim 17, wherein said retaining arms are formed in each of said walls of relatively shorter length and said tabs are provided in each of said walls of relatively longer length.

19. The invention as defined in claim 18, wherein said tabs have a generally rectangular configuration.

20. A one-piece, self-retaining metal clip for use in connecting an electrical conduit having a helically grooved outer metal covering and electrical wires therein within a generally round aperture in a junction box or the like, said one-piece metal clip being adapted to extend through said aperture in a wall portion of said junction box, said one-piece metal clip comprising a body portion defined by generally flat walls for extending through said aperture in said junction box, said body portion having a first opening at one end thereof for receipt of said electrical wires and a second opening at the other end thereof for receipt of said electrical conduit, flange means at said other end of said body portion for engaging the outer surface of said junction box, said flange means comprising deflectable portions which are attached to and extend transversely outwardly from the generally flat walls defining said body portion and which have surface portions for engagement with said outer surface of said junction box upon insertion of said one-piece metal clip into said aperture in said wall portion of said junction box, retaining arms formed in at least two of said walls defining said body portion, each of said retaining arms projecting outwardly for a portion of the axial length of said walls defining said body portion and being resiliently deflectable radially inwardly upon insertion of said body portion through said aperture in said junction box and springing outwardly upon passing through said aperture so as to engage the inner surface of said junction box, said retaining arms, in an undeformed position, being separated from said flange means by an axial distance less than the thickness of said wall portion of said junction box permitting said one-piece metal clip to be resiliently clamped to said junction box by said flange means and said retaining arms so as to positively electrically ground said one-piece metal clip to said junction box, at least two of said walls defining said body portion also having an inwardly extending tab formed therein, said tabs extending transversely toward the central axis of said body portion and having an inner elongated edge, said tabs being located at axially and circumferentially offset locations on said body portion permitting said inner elongated edges to be disposed along a helix of the same pitch as the helical groove in the metal covering to threadably connect said metal covering with said body portion, said tabs being spaced from said flange means toward said one end of said body portion causing said tabs to be disposed within said junction box when said electrical conduit is connected to said junction box, and collar means connected to said one end of said body portion to shield said electrical wires from engagement with any burrs which may be present on the outer end portion of said electrical conduit, said collar means including a rim portion disposable within said electrical conduit in a telescopic relationship with said outer end portion of said electrical conduit.

21. A one-piece, self-retaining metal clip as defined in claim 20, wherein said body portion is of a square shape in cross-section and each of said retaining arms is adjacent to and projects outwardly from an axially extending edge of said wall defining said square body portion.

22. A one-piece, self-retaining metal clip as defined in claim 21, wherein said retaining arms are connected to each of said walls defining said square body portion and said tabs are provided in each of said walls defining said square body portion.

23. A one-piece, self-retaining metal clip as defined in claim 22, wherein said tabs have a generally rectangular configuration.

24. A one-piece, self-retaining metal clip as defined in claim 20, wherein said body portion is of a generally truncated equilateral triangular shape in cross section and is defined by three axially extending walls of relatively longer width alternately interspersed among three axially extending walls of relatively shorter width, said tabs being provided in at least two of said walls of relatively longer width and said retaining arms being formed in at least two of said walls of relatively shorter width.

25. A one-piece, self-retaining metal clip as defined in claim 24, wherein said tabs are provided in each of said walls of relatively longer width and said retaining arms are formed in each of said walls of relatively shorter width.

26. A one-piece, self-retaining metal clip as defined in claim 25, wherein said tabs have a generally rectangular configuration.

27. A one-piece, self-retaining metal clip as defined in claim 20, wherein said body portion is of a hexagonal shape in cross section having three axially extending walls of relatively longer length alternately interspersed among three axially extending walls of relatively shorter length, said tabs being provided in at least two of said walls of relatively longer length and said retaining arms being formed in at least two of said walls of relatively shorter length.

28. A one-piece, self-retaining metal clip as defined in claim 27, wherein said tabs are formed in each of said walls of relatively longer length and said retaining arms are provided in each of said walls of relatively shorter length.

29. A one-piece, self-retaining metal clip as defined in claim 28, wherein said tabs have a generally rectangular configuration.

* * * * *

UNITED STATES PATENT OFFICE
CERTIFICATE OF CORRECTION

Patent No. 4,012,578      Dated  March 15, 1977

Inventor(s)   Thomas M. Moran et al.

It is certified that error appears in the above-identified patent and that said Letters Patent are hereby corrected as shown below:

Column 1, line 15, "theaded" shuuld read -- threaded --.

Column 2, line 27, "onepiece" should read -- one-piece --.

Column 8, line 54, "onepiece" should read -- one-piece --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*